United States Patent
Maruoka et al.

(10) Patent No.: US 7,036,541 B2
(45) Date of Patent: May 2, 2006

(54) PNEUMATIC TIRE

(75) Inventors: Kiyoto Maruoka, Kobe (JP); Minoru Nishi, Kobe (JP); Atsushi Yamahira, Kobe (JP); Satoshi Tsuda, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 386 days.

(21) Appl. No.: 10/471,260

(22) PCT Filed: Oct. 9, 2002

(86) PCT No.: PCT/JP02/10495

§ 371 (c)(1),
(2), (4) Date: Sep. 10, 2003

(87) PCT Pub. No.: WO03/035413

PCT Pub. Date: May 1, 2003

(65) Prior Publication Data

US 2004/0079460 A1    Apr. 29, 2004

(30) Foreign Application Priority Data

Oct. 19, 2001    (JP) .............................. 2001-322427

(51) Int. Cl.
*B60C 3/00*    (2006.01)
*B60C 9/18*    (2006.01)
*B60C 11/00*    (2006.01)

(52) U.S. Cl. .................. 152/209.14; 152/454; 152/532

(58) Field of Classification Search ........... 152/209.14, 152/454, 532
See application file for complete search history.

(56) References Cited

U.S. PATENT DOCUMENTS 5,647,925 A * 7/1997 Sumiya et al. ......... 152/209.14

FOREIGN PATENT DOCUMENTS

| JP | 3-121905 A | 5/1991 |
|---|---|---|
| JP | 4-183607 A | 6/1992 |
| JP | 5-77608 A | 3/1993 |
| JP | 5-221205 A | 8/1993 |
| JP | 7-164823 A | 6/1995 |
| JP | 11-34613 A | 2/1999 |
| JP | 2000-71716 A | 3/2000 |
| JP | 2000-177316 A | 6/2000 |

* cited by examiner

*Primary Examiner*—Adrienne C. Johnstone
(74) *Attorney, Agent, or Firm*—Birch Stewart Kolasch & Birch LLP (57) ABSTRACT

A standard grounding surface shape F0 becomes a maximum grounding length Lc at a tire equator C and becomes a shortest grounding length Lm between the tire equator C and a grounding edge TE. The shortest grounding length Lm is located in a region away from the tire equator C by a distance of 0.5 to 0.9 times of a tread half width TW. A rubber thickness t1 between the carcass cord and the belt cord is gradually increased outward in the axial direction of the tire from the tire equator, and the rubber thickness t1 in a half width position Q which is away from the tire equator by a distance of 0.55 times of the tread half width TW is set to 0.5 to 3.0 mm. A ratio $t2q/t2c$ between a tread entire thickness $t2c$ in the half width position Q and a tread entire thickness $t2c$ in the tire equator is set to $1.01\pm0.05$.

6 Claims, 6 Drawing Sheets

PNEUMATIC TIRE

This application is the national phase under 35 U.S.C. § 371 of PCT International Application No. PCT/JP02/10495 which has an International filing date of Oct. 9, 2002, which designated the United States of America.

TECHNICAL FIELD

The present invention relates to a pneumatic tire which is suitable as a heavy load tire into which a high internal pressure is charged and which restrains uneven wear at a tread portion.

BACKGROUND TECHNIQUE

Figure 6:
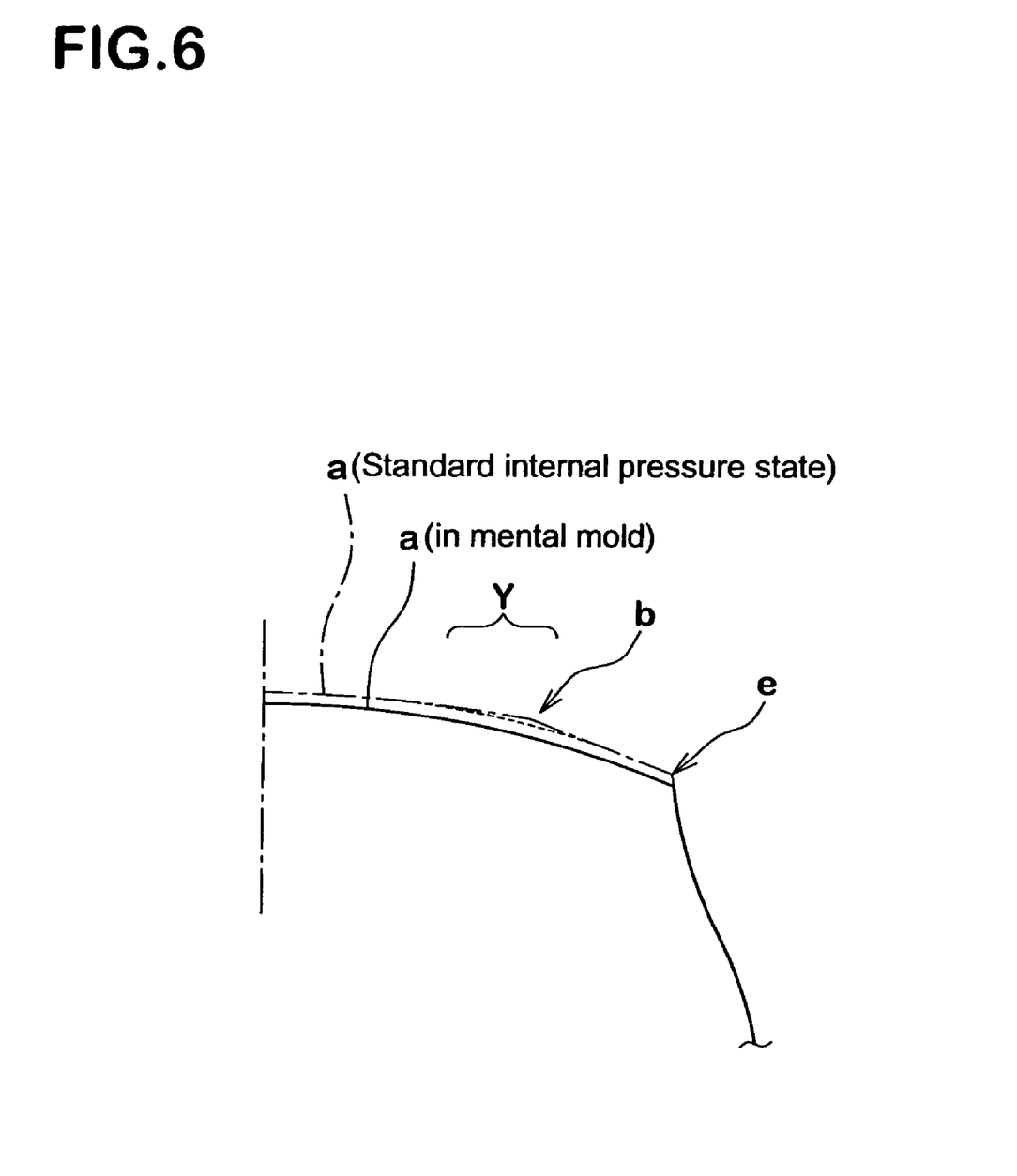
FIG. 6 is a diagram for explaining a problem of a conventional technique.

In a heavy load tire for example, generally, its tread outline shape a is formed into a single arc shape in a vulcanizing metal mold as simply shown in FIG. 6.

In such a tire, however, in a standard internal pressure state in which the tire is assembled into a rim and a standard internal pressure is charged into the tire, there is a tendency that a tread surface swells radially outward in a region y which is separated from a tire equator by a distance of 0.5 to 0.7 times of a tread half width. For this reason, a difference in circumferential lengths between a swelling portion b and a tread grounding end e is increased, slip between the tread surface on the side of the tread grounding end and a road surface is generated, and uneven wear such as so-called shoulder wear is prone to be generated.

On the other hand, in order to restrain the shoulder wear, Japanese Patent Application Laid-open No. H7-164823 and the like disclose a technique in which the outline of the tread in the vulcanizing metal mold is formed into a double radius shape in which a portion of the tread on the side of the tread grounding end is an arc having a greater radius of curvature than a portion of the tread on the side of the tire equator, thereby bringing the outline of the tread in the standard internal pressure state closer to the single arc to restrain the shoulder portion decrease wearing.

Such a technique can restrain the shoulder portion decrease wearing in some degree but there is a problem that new uneven wear is produced in the region y. Especially when a circumferential groove is formed in the region y, uneven wears are seriously generated in inside and outside of the circumferential groove in the axial direction of the tire.

Thereupon, it is an object of the present invention to provide a pneumatic tire in which the uneven wear from the tire equator to the tread edge is restrained and the wear resistance is enhanced.

DISCLOSURE OF THE INVENTION

An invention of claim 1 of this application provides a pneumatic tire comprising a carcass including a carcass ply extending from a tread portion to a bead core of a bead portion through a sidewall portion, and a belt layer having a belt ply arranged inside the tread portion and outside the carcass, wherein a standard grounding surface shape when a standard load is applied to the pneumatic tire in a state in which the tire is assembled into a standard rim and a standard internal pressure is charged into the tire includes an inner region including a shortest grounding length Lm between a central region including a grounding length Lc at a tire equator in which a grounding length L in a circumferential direction of the tire becomes maximum and a tread edge region including a grounding length Le at a grounding edge, said grounding length Lm the shorter than the grounding length Lc and the grounding length Le, the shortest grounding length Lm is located in a range apart from the tire equator by a distance of 0.5 to 0.9 times of a tread half width TW, a rubber thickness t1 between a carcass cord of the carcass ply and a belt cord of the radially inward belt ply which is the closest to the carcass cord is gradually increased outward in an axial direction of the tire from the tire equator, the rubber thickness $t1q$ in a half width position of 0.55 times of the tread half width TW from the tire equator is set to 0.5 to 3.0 mm, a ratio $t2q/t2c$ between an entire thickness $t2q$ of the tread portion if the half width position and an entire thickness $t2c$ of the tread portion in the tire equator is set to $1.01\pm0.05$.

According to an invention of claim 2, in 80% internal pressure grounding surface shape when a standard load is applied to the tire in 80% internal pressure state in which the tire is assembled into the standard rim and 80% internal pressure of the standard internal pressure is charged, a ratio Lsm/Lsc between a grounding length Lsm which becomes the shortest in a region from a position away from the tire equator by a distance of 0.5 times of the tread half width TW to the grounding edge and a grounding length Lsc at the tire equator is set to 0.75 to 0.99.

In this specification, in specifications system including specifications on which a tire is based, the term "standard rim" is a rim whose specifications are determined for each tire. For example, the rim is a standard rim in the case of JATMA, the rim is a "Design Rim" in the case of TRA, and the rim is a "Measuring Rim" in the case of ETRTO. In the specifications system including specifications on which a tire is based, the term "standard internal pressure" is an air pressure whose specifications are determined for each tire, and the standard internal pressure is a maximum air pressure in the case of JATMA, the standard internal pressure is a maximum value described in "TIRE LOAD LIMITS AT VARIOUS COLD INFLATION PRESSURE" in the case of TRA, and the standard internal pressure is an "INFLATION PRESSURE" in the case of ETRTO. If the tire is for a passenger car, the standard internal pressure is 180 kPa.

Further, the "standard internal pressure" is air pressure determined by the specifications for each tire, and the standard internal pressure is maximum load ability in the case of the JATMA, and the standard internal pressure is a maximum value described in a table "TIRE LOAD LIMITS AT VARIOUS COLD INFLATION PRESSURES" in the case of the TRA, and the and the standard internal pressure is "LOAD CAPACITY" in the case of the ETRTO.

BEST MODE FOR CARRYING OUT THE INVENTION

An embodiment of the present invention will be explained based on the illustrated example.

Figure 1:
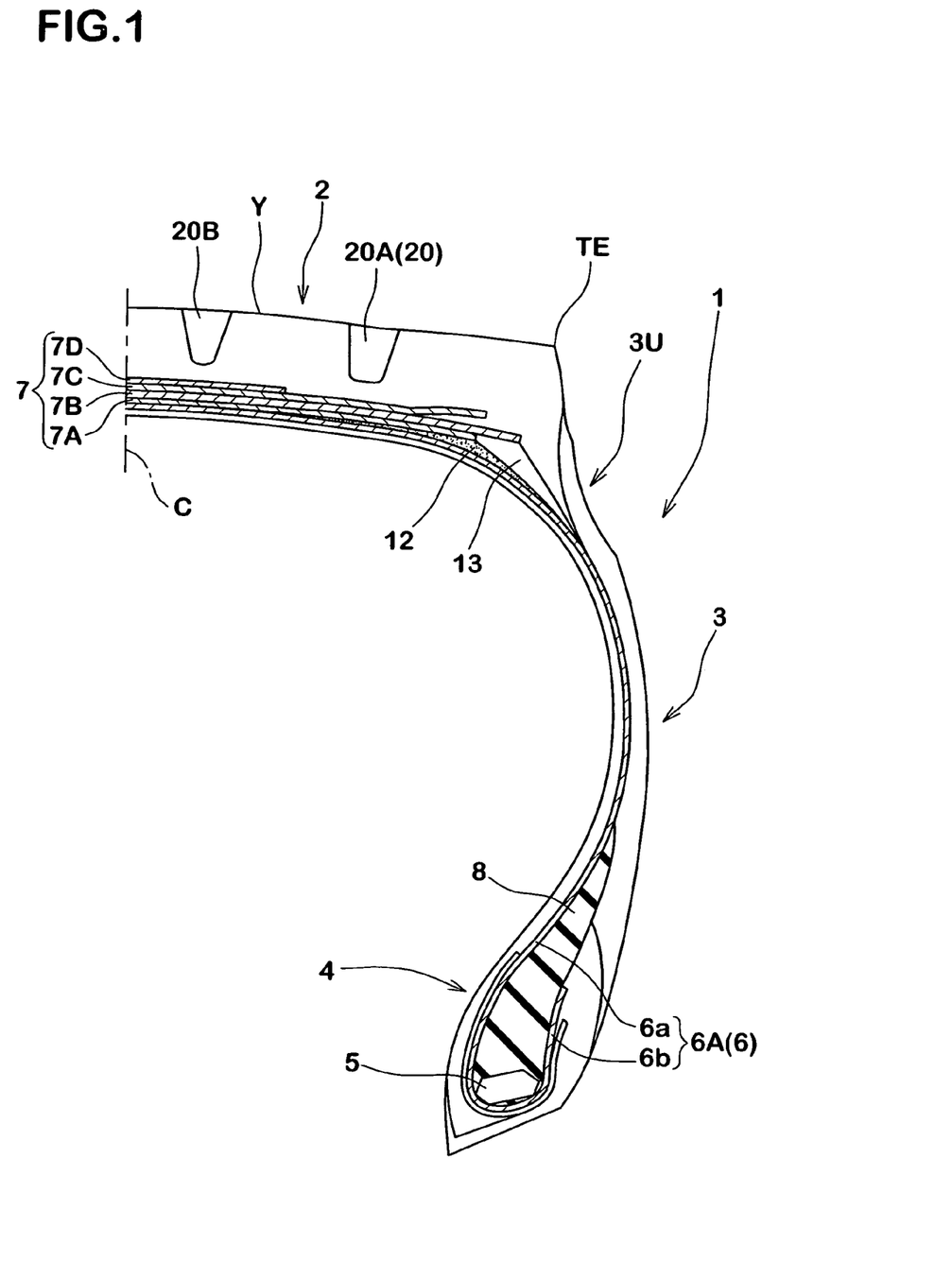
FIG. 1 is a sectional view of a tire according to an embodiment of the present invention.
Figure 2:
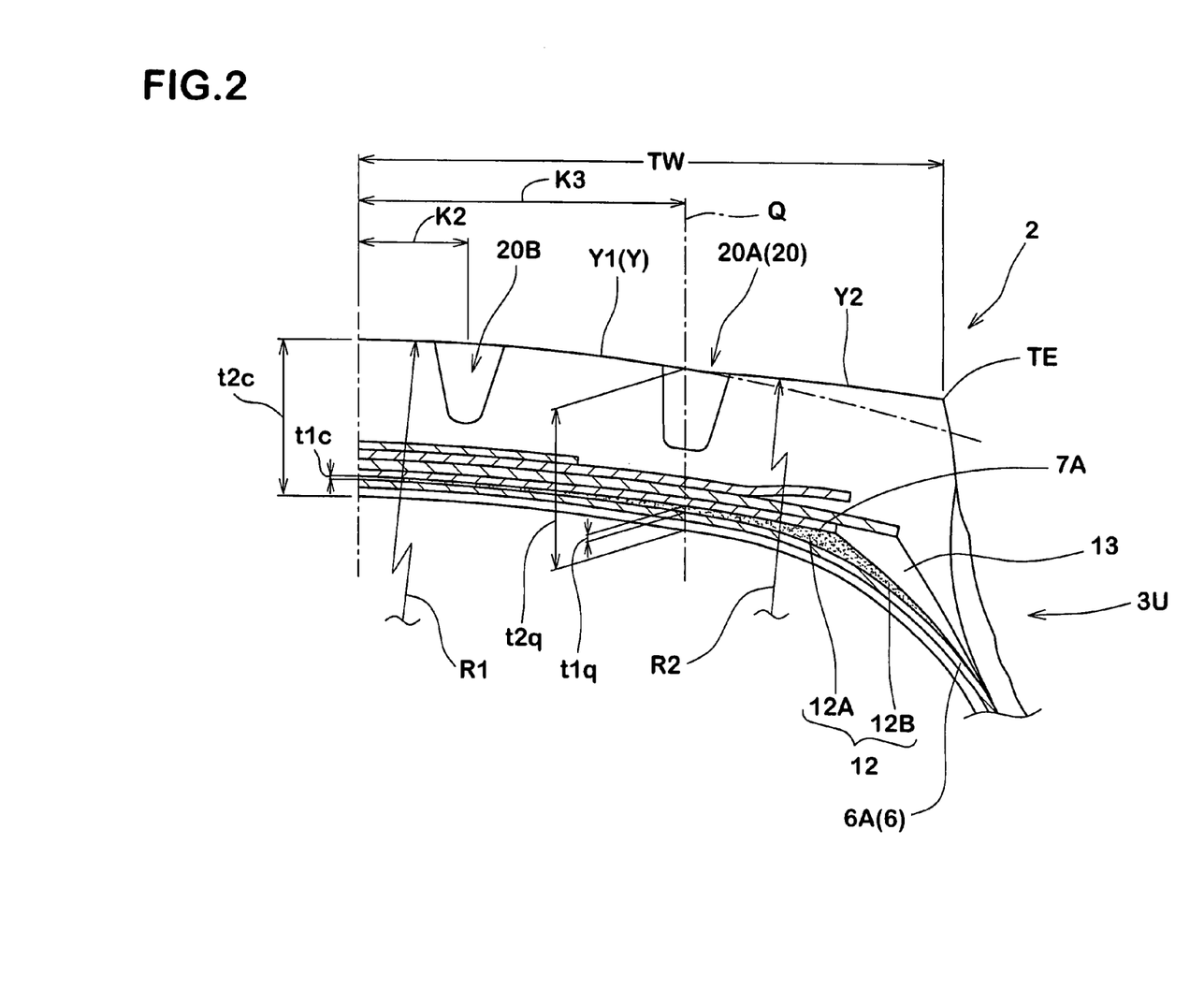
FIG. 2 is an enlarged sectional view of a tread portion.

FIG. 1 is a sectional view of a heavy load pneumatic radial tire for a truck, a bus or the like according to the present invention, and FIG. 2 is an enlarged view of a tread portion of the tire.

In FIG. 1, a pneumatic tire 1 includes a carcass 6 extending from a tread portion 2 to a bead core 5 of a bead portion 4 through a sidewall portion 3, and a belt layer 7 disposed inside the tread portion 2 and outside the carcass 6.

The carcass 6 is formed of one or more (one, in this example) of carcass ply 6A in which carcass cords are arranged at an angle of 70 to 90° with respect to a circumferential direction of the tire. Metal cords such as steel are preferable as the carcass cords, but organic fiber cords such as nylon, rayon, polyester, aromatic polyamide or the like may also be used if necessary.

The carcass ply 6A includes ply bodies 6a and 6a extending between the bead cores 5 and 5, and folded-back portions 6b and 6b folded back and retained around the bead cores 5 and 5. A bead apex rubber 8 extending in a taper manner from the bead core 5 radially outward is disposed between the ply body 6a and the folded-back portion 6b. The bead apex rubber 8 reinforces a portion of the tire from the bead portion 4 to the sidewall portion 3.

The belt layer 7 is formed of three or more belt plies using metal cords as the belt cords. In this example, steel cords have four plies, i.e., a first belt ply 7A which is arranged at an angle of 60±15° with respect to the circumferential direction of the tire and disposed at innermost portion in the radial direction, and second to fourth belt plies 7B, 7C and 7D arranged at small angle of 10 to 35° with respect to the circumferential direction of the tire. This belt layer 7 has one or more locations where the belt cords intersect with each other between the plies. With this structure, the belt rigidity is enhanced, and the tread portion 2 is reinforced with hoop effect.

Figure 3:
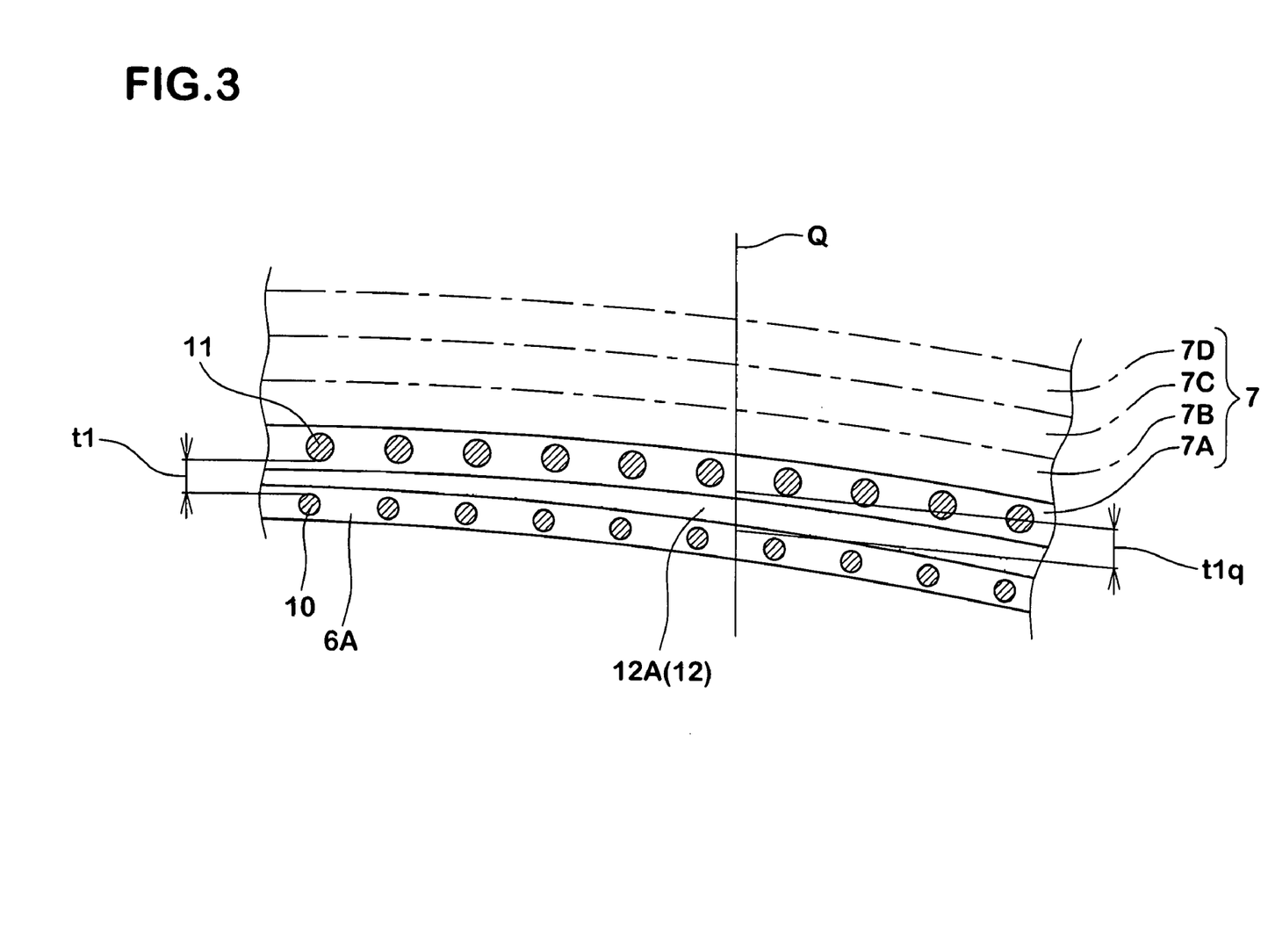
FIG. 3 is a diagram for explaining a rubber thickness between a carcass cord and a belt cord.

As shown in FIGS. 2 and 3 in an exaggeration manner, in the tire of the present invention, a rubber thickness t1 between the carcass cord 10 of the carcass ply 6A and the belt cord 11 of the first belt ply 7A which is closest to the carcass cord 10 is gradually increased from the tire equator C toward axially outward of the tire. In FIG. 3, the carcass cords 10 and the belt cords 11 have right angle cross section while ignoring the arrangement angle of the cords for convenience's sake.

Especially in this example, an auxiliary rubber layer 12 is interposed between the carcass 6 and the belt layer 7 to gradually increase the rubber thickness t1. That is, the auxiliary rubber layer 12 includes a main portion 12A which extends from the tire equator C to an outer end of the first belt ply 7A while gradually increasing its thickness. In this example, a wing portion 12B which comes into contact with the carcass 6 and extends and terminates in a buttress portion 3U is connected to an outer end of the main portion 12A while gradually reducing a thickness of the wing portion 12B.

A conventional cushion rubber 13 is interposed between the second belt ply 7B and the wing portion 12B at outer side of the outer end of the first belt ply 7A in the axial direction of the tire, thereby moderating the stress concentration at the belt end. As the cushion rubber 13, it is preferable to use a low heating value rubber having small loss tangent so that heat is not accumulated. It is also possible to control the coating thickness of topping rubber in the carcass ply 6A and/or the first belt ply 7A to gradually increasing the rubber thickness t1 without providing the auxiliary rubber layer 12.

In a state in which the internal pressure is not charged into the tire, as shown in FIG. 2, the outline Y of the tread portion 2 in the meridional cross section is formed into a double radius shape comprising a first arc Y1 on the side of the tire equator having a radius of curvature R1 whose center is on the tire equator plane, and a second arc Y2 on the side of the tread edge having a larger radius of curvature R2 than that of the radius of curvature R1 (R2>R1).

With this structure, the tread outline shape in a standard internal pressure state in which the tire is assembled into a standard rim and the standard internal pressure is charged is brought into closer to a single arc having a radius of curvature of 650±100 mm.

Figure 4:
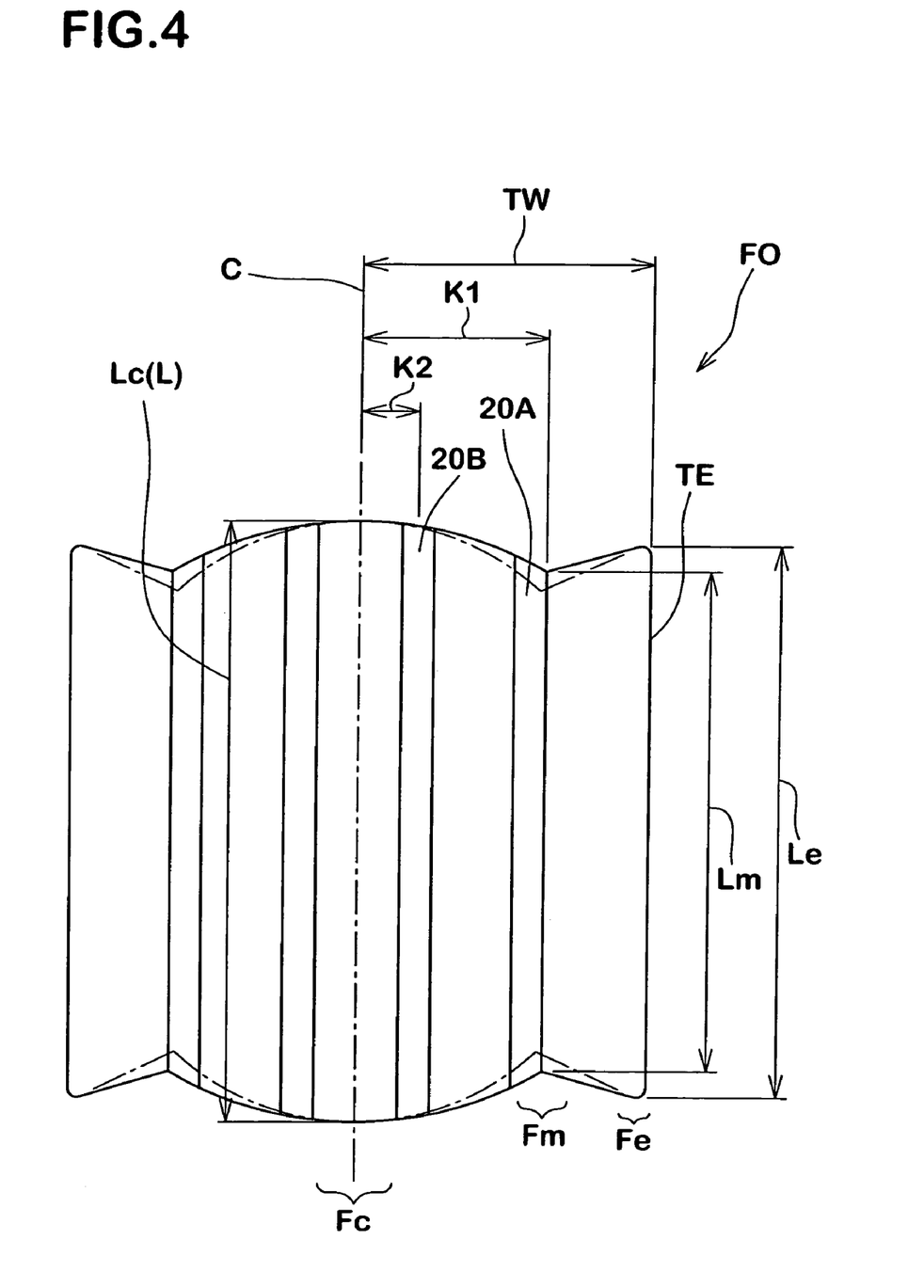
FIG. 4 is a diagram showing a standard grounding surface shape of the tire.

On the other hand, by bringing the tread outline in the standard internal pressure is close to the single arc, as shown in FIG. 4, a standard grounding surface shape F0 (so-called foot print) when a standard load is applied to the tire in the standard internal pressure includes an inner region Fm including a shortest grounding length Lm between a central region Fc including a grounding length Lc on the tire equator C at which the grounding length L in the circumferential direction of the tire becomes maximum and a tread edge region Fe including a grounding length Le at the grounding edge TE on the side of the tread edge side.

That is, in the standard grounding surface shape F0, the grounding length Lc on the tire equator C is the longest, the grounding length Le at the grounding edge TE does not become the shortest, and the shortest grounding length Lm exists between the tire equator C and the grounding edge TE (Lc>Le>Lm). At that time, a distance K1 from the tire equator C at the position of the shortest grounding length Lm is in a range of 0.5 to 0.7 times of a tread half width TW which is a distance from the tire equator C to the grounding edge TE.

With such a structure, a grounding pressure at the tread edge region Fe is gradually increased from the inner region Fm toward the grounding edge TE and the grounding is carried out reliably even at the grounding edge TE and thus, the shoulder portion decrease wearing is effectively restrained.

On the contrary, since the grounding pressure is reduced in the inner region Fm, there is a tendency that new uneven wear is generated in the inner region Fm. Especially in this example, the tread portion 2 is formed with a tread groove 20 which at least includes a circumferential groove 20A extending in the circumferential direction of the tire through the inner region Fm. Therefore, uneven wear is prone to be generated inside and outside of the circumferential groove 20A in the axial direction of the tire. In this example, a circumferential groove 20B is further provided in a region which is away from the tire equator C by a distance K2 which is 0.2±0.05 times of the tread half width TW.

Thereupon, in order to restrain the uneven wear in the inner region Fm, according to the present invention, 1) The rubber thickness t1 between the carcass cord 10 of the carcass ply 6A and the belt cord 11 of the first belt ply 7A is gradually increased from the tire equator C toward the outside in the axial direction of the tire, and a rubber thickness t1q in the half width position Q which is away from the tire equator C by a distance K3 which is 0.55 times of the tread half width TW is set to 0.5 to 3.0 mm;

2) A ratio $t2q/t2c$ between the entire thickness $t2q$ of the tread portion 2 in the half width position Q and the entire thickness $t2c$ of the tread portion 2 in the tire equator C is set to $1.01 \pm 0.05$.

By employing the above structures 1) and 2), it is possible to enhance the grounding pressure, and to bring the ratio Lm/Lc between the shortest grounding length Lm and the longest grounding length Lc closer to 0.85 to 0.99 and 1.0 for example. As a result, it is possible to restrain the uneven wear in the inner region Tm, to restrain the uneven wear over the entire width from the tire equator C to the tread edge, and to enhance the wear resistance of the tire.

If the rubber thickness $t1q$ is less than 0.5 mm, uneven wear is generated in the region y away from the tire equator C by a distance of 0.5 to 0.7 times of the tread half width TW, and if the rubber thickness $t1q$ exceeds 3.0 mm, shoulder portion decrease wearing is generated in a shoulder portion. A difference $t1q-t1c$ between the rubber thickness $t1q$ and the rubber thickness $t1c$ on the tire equator C is in a range of 0.1 to 1.0 mm.

If the ratio $t2q/t2c$ is less than 0.96, uneven wear is generated in the region y, and if the ratio exceeds 1.06, shoulder wear is generated in the shoulder portion.

As a result of research of the present inventor, it was found that in an actual running, uneven wear such as shoulder wear was generated in some cases due to difference in running conditions. It is conceived that as a method for evaluating the wear of a tire, using the standard grounding surface shape F0, a portion thereof whose grounding length L becomes the shortest causes the wear, but in actual case, a load is applied to rear wheels on an upward slope, or a load is excessively applied to front wheels on a downward slope or the internal pressure is slightly reduced by size growth of the tire and the tire is deformed largely in many cases and due to this, it is assumed that mismatch with respect to the standard grounding surface shape F0 is caused.

Thereupon, the present inventor proposed to employ, as a new index for the wear evaluation, 80% internal pressure grounding surface shape F1 when a standard load was applied to a tire in which the tire was assembled into a rim and 80% internal pressure was charged into the tire. This 80% internal pressure grounding surface shape F1 indicates the grounding surface shape when a tire is deformed larger. It was found that by using this, it was possible to evaluate an uneven wear over the entire width from the tire equator C to the tread edge in accordance with actual running, which could not be evaluated by the conventional method.

Figure 5:
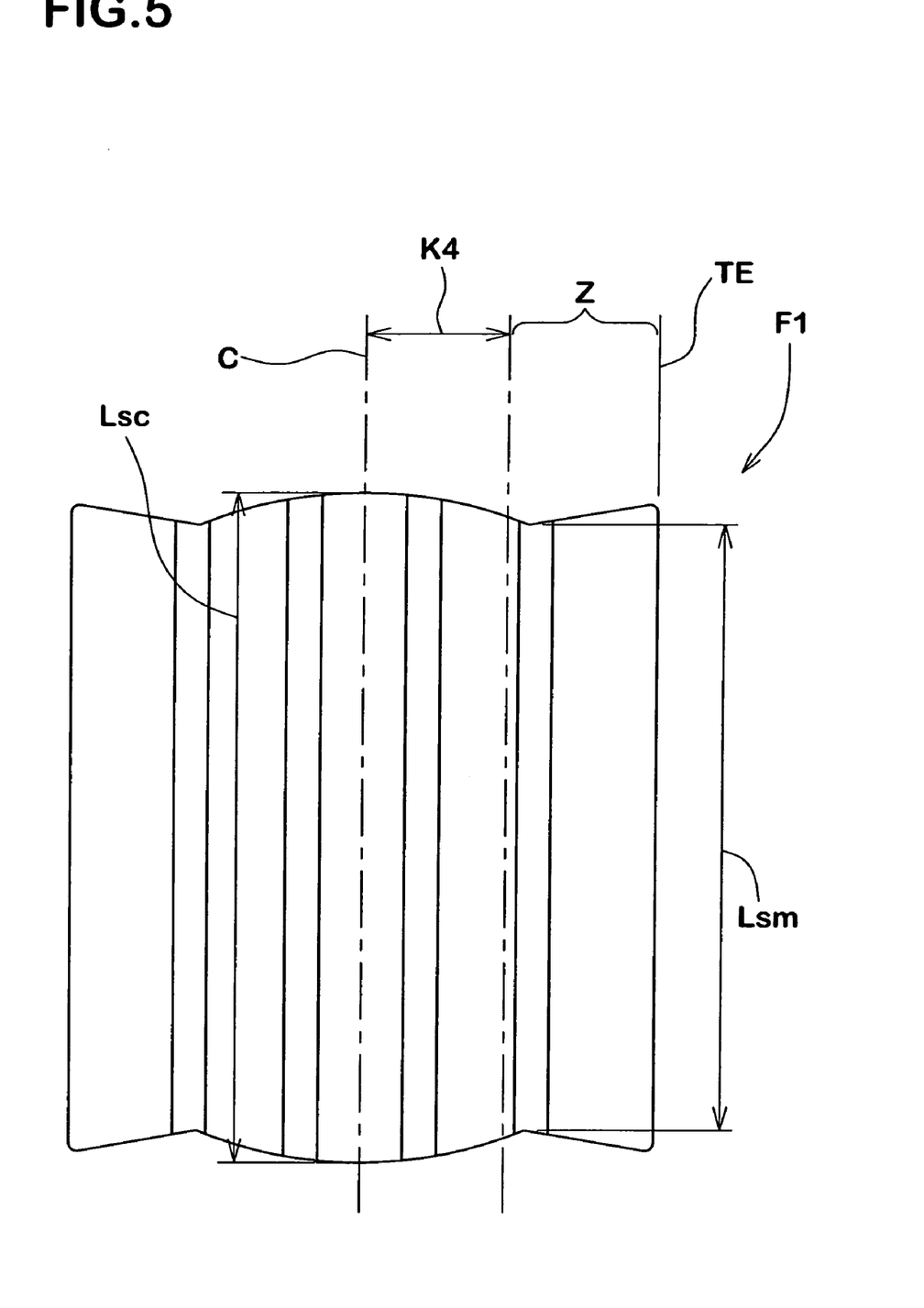
FIG. 5 is a diagram showing 80% internal pressure grounding surface shape of the tire.

More specifically, as shown in FIG. 5, in the 80% internal pressure grounding surface shape F1, a ratio Lsm/Lsc between the shortest grounding length Lsm in a region Z from a position away from the tire equator C by a distance K4 which is 0.5 times of the tread half width TW and the grounding length Lsc at the tire equator C is set in a range of 0.75 to 0.99. If the ratio is in this range, it is possible to restrain the uneven wear at a position of the shortest grounding length Lsm, and to enhance the uneven wear over the entire width from the tire equator C to the tread edge.

If the ratio Lsm/Lsc is less than 0.75, uneven wear is generated in a position near the shortest grounding length Lsm, and if the ratio exceeds 0.99, uneven wear is generated in a position near the tire equator. As described above, adverse effects are invited.

Although the preferred embodiment of the present invention has been described in detail, the invention is not limited to the illustrated embodiment, and can also be applied to tires in various categories such as a passenger car, a small truck, a construction or industrial vehicle and the like.

Embodiment

Heavy load tires of tire size of 295/80R22.5 having the structure shown in FIG. 1 were prototyped based on the specification shown in Table 1, and uneven wear performances of the prototyped tires were tested. Results thereof are shown in Table 1. Here, in "relation of grounding length L" in Table 1, cases in which the grounding length Lc on the tire equator C is the longest, the grounding length Le at the grounding edge TE is not the shortest, and the shortest grounding length Lm exists between the tire equator C and the grounding edge TE (Lc>Le>Lm) are shown with "O", and other cases such as a case in which the grounding length Le at the grounding edge TE is the shortest are shown with "x".

(1) Uneven Wear Performance;

The prototyped tires were mounted to all wheels of a truck (2-2/D type) with rims (22.5×8.25) and internal pressure (900 kPa), the vehicle was allowed to run the distance of 50,000 km, and amounts of groove depths reduced in the circumferential grooves 20A and 20B caused by wear after running were compared with each other. If the reduced amount is large, a difference in wear is large and uneven wear performance is inferior.

TABLE 1

|  | Embodiment 1 | Embodiment 2 | Embodiment 3 | Embodiment 4 | Embodiment 5 |
|---|---|---|---|---|---|
| Tread radius of curvature <mm> in standard internal pressure state | 640 | 640 | 640 | 570 | 730 |
| Rubber thickness between cords of carcass and belt layer | | | | | |
| t1q <mm> | 0.8 | 1.5 | 2.4 | 1.6 | 1.6 |
| t1c <mm> | 0.5 | 0.5 | 0.5 | 0.5 | 0.5 |
| Entire thickness of tread | | | | | |
| t2q <mm> | 31.8 | 32.0 | 32.6 | 32.1 | 32.1 |
| t2c <mm> | 32.0 | 32.0 | 32.0 | 32.0 | 32.0 |
| Ratio t2q/t2c | 1.0 | 1.01 | 1.03 | 1.01 | 1.01 |
| Standard grounding surface shape | FIG. 4 | FIG. 4 | FIG. 4 | FIG. 4 | FIG. 4 |
| Relation of grounding length L | O | O | O | O | O |
| Ratio Lm/Lc | 0.85 | 0.96 | 0.98 | 0.96 | 0.96 |
| 0.8 internal pressure grounding surface shape | FIG. 5 | FIG. 5 | FIG. 5 | FIG. 5 | FIG. 5 |
| Ratio Lsm/Lsc | 0.75 | 0.92 | 0.95 | 0.92 | 0.92 |

TABLE 1-continued

| Uneven wear performance | | | | | |
|---|---|---|---|---|---|
| Reduced amount <mm> of circumferential groove 20B | 4.7 | 4.9 | 4.7 | 4.7 | 5.1 |
| Reduced amount <mm> of circumferential groove 20A | 5.9 | 5.1 | 4.8 | 5.3 | 3.9 |
| Difference B − A <mm> | 1.2 | 0.2 | 0.1 | 0.6 | −1.2 |

| | Comparative example 1 | Comparative example 2 | Comparative example 3 | Comparative example 4 |
|---|---|---|---|---|
| Tread radius of curvature <mm> in standard internal pressure state | 520 | 640 | 645 | 800 |
| Rubber thickness between cords of carcass and belt layer | | | | |
| t1q <mm> | 0.2 | 0.3 | 3.1 | 3.2 |
| t1c <mm> | 0.5 | 0.5 | 0.5 | 0.5 |
| Entire thickness of tread | | | | |
| t2q <mm> | 32.1 | 31.3 | 34.1 | 34.2 |
| t2c <mm> | 32.0 | 32.0 | 32.0 | 32.0 |
| Ratio t2q/t2c | 0.95 | 1.0 | 1.0 | 1.08 |
| Standard grounding surface shape | — | FIG. 4 | FIG. 4 | FIG. 4 |
| Relation of grounding length L | × (Le is shortest) | ○ | ○ | ○ |
| Ratio Lm/Lc | 0.80 | 0.79 | 1.01 | 1.02 |
| 0.8 internal pressure grounding surface shape | — | FIG. 5 | FIG. 5 | FIG. 5 |
| Ratio Lsm/Lsc | 0.7 | 0.7 | 1.01 | 1.04 |
| Uneven wear performance | | | | |
| Reduced amount <mm> of circumferential groove 20B | 4.2 | 4.5 | 7.4 | 7.6 |
| Reduced amount <mm> of circumferential groove 20A | 6.4 | 6.8 | 5.1 | 4.9 |
| Difference B − A <mm> | 2.2 | 2.3 | −2.3 | −2.7 |

As shown in the Table, it can be confirmed that in the case of the tires of the embodiments, the uneven wear is enhanced.

INDUSTRIAL APPLICABILITY

According to the pneumatic tire of the present invention as described above, it is possible to restrain the uneven wear from the tire equator to the tread edge, to enhance the wear resistance, and to suitably apply the invention to a heavy load tire used under high internal pressure and high load.

The invention claimed is:

1. A pneumatic tire comprising a carcass including a carcass ply extending from a tread portion to a bead core of a bead portion through a sidewall portion, and a belt layer having a belt ply arranged inside the tread portion and outside the carcass, wherein
a standard grounding surface shape when a standard load is applied to the pneumatic tire in a state in which the tire is assembled into a standard rim and a standard internal pressure is charged into the tire includes an inner region including a shortest grounding length Lm between a central region including a grounding length Lc at a tire equator in which a grounding length L in a circumferential direction of the tire becomes maximum and a tread edge region including a ground length Le at a grounding edge, said grounding length Lm the shorter than the grounding length Lc and the grounding length Le,
the shortest grounding length Lm is located in a range apart from the tire equator by a distance of 0.5 to 0.9 times of a tread half width TW,
a rubber thickness t1 between a carcass cord of the carcass ply and a belt cord of the radially inward belt ply which is the closest to the carcass cord is gradually increased outward in an axial direction of the tire from the tire equator, furthermore, the rubber thickness t1q in a half width position of 0.55 times of the tread half width TW from the tire equator is set to 0.5 to 3.0mm,
additionally, a ratio t2q/t2c between an entire thickness t2q of the tread portion if the half width position and an entire thickness t2c of the tread portion in the tire equator is set to 1.01±0.05.

2. A pneumatic tire according to claim 1, wherein in 80% internal pressure grounding surface shape when a standard load is applied to the tire 80% internal pressure state in which the tire is assembled into the standard rim and 80% internal pressure of the standard internal pressure is charged, a ratio Lsm/Lsc between a grounding length Lsm which becomes the shortest in a region from a position away from the tire equator by a distance of 0.5 times of the tread half width TW to the grounding edge and a grounding length Lsc at the tire equator is set to 0.75 to 0.99.

3. A pneumatic tire according to claim 1 or 2, wherein the belt cord of the belt layer is a metal cord.

4. A pneumatic tire according to claim 1, wherein the belt layer comprises three or more layers, and the pnematic tire is a heavy load radial tire.

5. A pneumatic tire according to claim 1, wherein the inner region is provided with a circumferential groove extending in the circumferential direction of the tire.

6. A pneumatic tire according to claim 5, wherein the circumferential groove is provided in a region away from the tire equator by a distance of 0.2±0.05 times of the tread half width TW.

* * * * *